(No Model.)
R. N. McCLAIN & J. H. CALDWELL.
SEED PLANTER AND CULTIVATOR.
No. 455,236. Patented June 30, 1891.
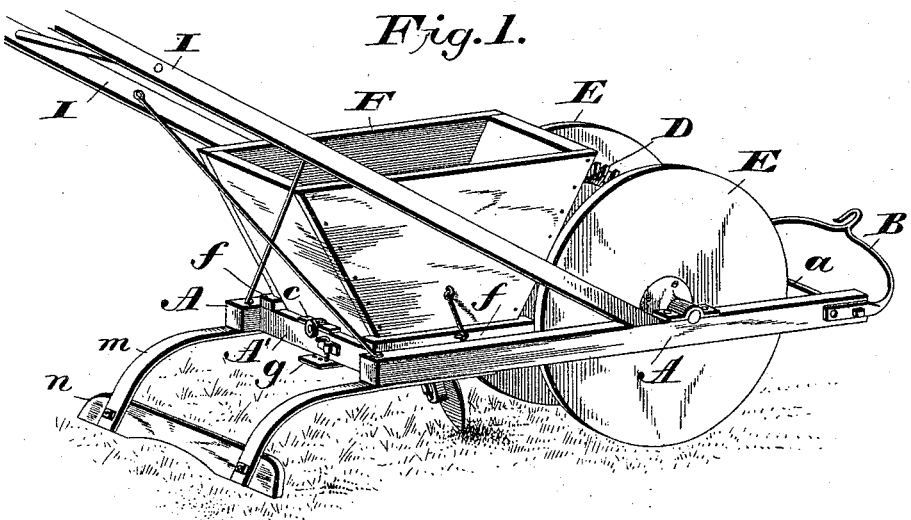
Fig. 1.
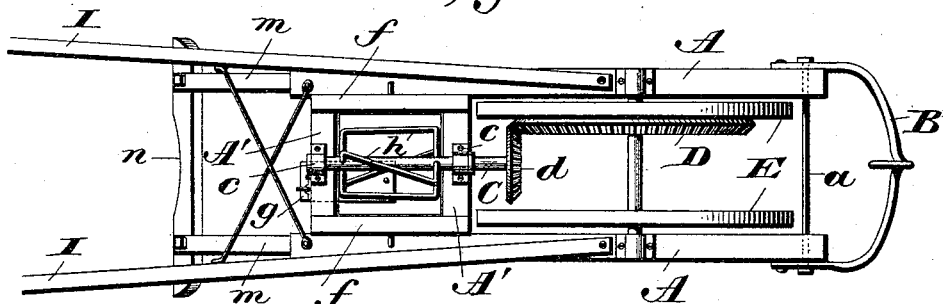
Fig. 2.
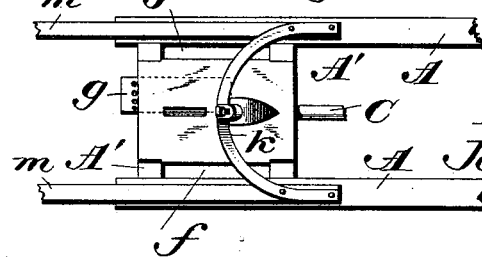
Fig. 3.
Witnesses
G. S. Elliott
C. W. Johnson
Rufus N. McClain.
John H. Caldwell.
Inventors,
by 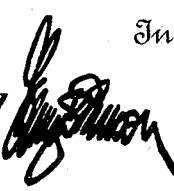
Attorney

UNITED STATES PATENT OFFICE.

RUFUS N. McCLAIN AND JOHN H. CALDWELL, OF WELLFORD, SOUTH CAROLINA.

SEED-PLANTER AND CULTIVATOR.

SPECIFICATION forming part of Letters Patent No. 455,236, dated June 30, 1891.

Application filed February 26, 1891. Serial No. 382,860. (No model.)

*To all whom it may concern:*

Be it known that we, RUFUS N. MCCLAIN and JOHN H. CALDWELL, citizens of the United States of America, residing at Wellford, in the county of Spartanburg and State of South Carolina, have invented certain new and useful Improvements in Seed-Planters and Cultivators; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in seed-planters, the same being especially designed for planting cotton-seed, though it is obvious that it may be used for planting or drilling other kinds of seed.

With our improvement we provide a seed-planting device which opens the furrow, drops the seed therein, and covers it all at one operation, and at the same time actuates an agitator in the seed-box; and the invention consists in the construction and combination of the parts, as will be hereinafter fully set forth, and particularly pointed out in the claims.

In the accompanying drawings, forming a part of this specification, Figure 1 is a perspective view. Fig. 2 is a plan view with the seed-box removed. Fig. 3 is a plan view of the under side of the planter.

A refers to the side beams, which are connected at their front ends by a transverse bolt *a*, and to which is secured the draft-bail B, eyes being provided near the ends of this draft-bail, through which small bolts pass for preventing the turning of the bail upon the bolt *a*. Near the rear ends of the side beams A A are rigidly secured transverse beams A', which are provided on their upper faces with bearing-boxes *c c*, in which is journaled a shaft C, said shaft carrying at its forward end a pinion *d*, which meshes with a toothed circle or cog-wheel D, attached to one of the supporting-wheels E, said supporting-wheels being mounted upon a common shaft, which is journaled in boxes bolted to the upper edges of the side beams A A. To the transverse beams A' are secured longitudinal strips *f*, upon which the sides of the seed-box F rest, said seed-box being secured to the strips *f* by hooks and eyes. The front and rear boards of the seed-box are inclined and extend downwardly, so as to rest over the central portions of the transverse beams A and the bearing-boxes *c*. A sheet-metal plate having a central longitudinal aperture is secured to the transverse beams A' and to the longitudinal strips *f*, and to the under side of the same is pivoted a cut-off *g*, which projects beyond the rear transverse beam A' of the frame, where it is provided with perforations, with which a vertical pin suitably supported engages, so that the size of the aperture through which the seed passes may be regulated by opening or closing the slide more or less, as may be desired. The shaft C over the aperture is provided with four or more bails *h*, and as said shaft is rotated these bails or stirrers will keep the seed agitated in the seed-box above the discharge-opening.

Handles I are secured to the side beams A A at their front ends, and said handles are provided with diagonal brace-bars, which extend from the cross-bar of the handle downwardly and are secured to the rear ends of the beams A. To the under sides of the beams A A is secured a segmental plate *k*, which is provided with a central depending portion having an elongated eye through which is passed the bolt for securing a shovel or furrow-opener in place, and in rear of this segmental plate *k* and to the under side of the beams A are attached spring-bars *m*, the rear ends of which are bent downwardly and have attached thereto a covering-board *n*.

The seed-planter, furrow-opener, and coverer hereinbefore described is extremely simple, and by means of the same a furrow is opened and the seed planted and covered by a single operation.

Having thus described our invention, what we claim as new, and desire to secure by Letters Patent, is—

1. The combination, in a seed-planter, of a seed-box supported on a frame and seed-discharge aperture in the bottom of said box, a shaft C, provided with bails *h*, having bent ends attached at right angles to the shaft and inclined in opposite directions, the center portion of the bails lying diagonally with respect to the shaft C, and mechanism for rapidly revolving the shaft, substantially as shown, and for the purpose set forth.

2. The combination, in a seed-planter, of supporting-wheels E E, journaled upon the front portion of the frame, a gear-wheel D, attached to the inner side of one of the supporting-wheels, a shaft C, journaled upon the frame and provided with a pinion d for rapidly rotating the same, said shaft C carrying a plurality of bails located within the seed-box, said bails having their ends bent at right angles and secured to the shaft C on different lines, so that the horizontal connecting portions will lie diagonally with said shaft, substantially as shown, and for the purpose set forth.

In testimony whereof we affix our signatures in presence of two witnesses.

RUFUS N. McCLAIN.
JOHN H. CALDWELL.

Witnesses:
T. R. TRIMNIDED,
JOHN SEVIER.